Patented Sept. 14, 1943

2,329,641

UNITED STATES PATENT OFFICE 2,329,641

METHOD OF PRODUCING SULPHATES

Walter Gordon Moran and John Edward Nelson, Woodbridge, N. J., assignors to National Lead Company, New York, N. Y., a corporation of New Jersey No Drawing. Application December 4, 1940, Serial No. 368,514

8 Claims. (Cl. 23—117)

This invention relates to processes in which titaniferous ores or other materials containing titanium are treated with sulphuric acid to recover the titanium values of said ores or materials in a water soluble form, and also to other processes in which acids are employed in reactions which will result in the formation of end products having a more or less solid or dry consistency.

The problem of handling reactions involving, for example, concentrated sulphuric acid and ilmenite, or acid and residues obtained from such reactions, is mainly of a technical nature. In such reactions the titaniferous material and the acid are stirred together whereupon the mixture is heated until the reaction is started and kept at about the reaction temperature which is in the neighborhood of 200° C., until the reaction is completed; this period is generally called the curing or the baking period.

Certain difficulties inherent in reactions of this kind have created constant problems to the industry. Thus, the problem of removing the reacted mass from pans or tanks and particularly from any apparatus involving a continuous process has been the subject of much attention.

It is a well-known fact that where, for example, ilmenite and concentrated sulphuric acid are made to react with each other the reaction mass will adhere or stick to any surface with which it is in contact. Therefore, in the past when operating in pans or on flat metal surfaces and the like, the finished reaction product had to be removed by mechanical (or manual) means such as chipping and scraping. When the ore-acid mixture was reacted in deep tanks it was found necessary to keep the reacting mass in constant motion by injection of compressed air or live steam so as not to obtain the final product in the form of a solid cake, which would adhere to the sides of the tank and which would be difficult to disintegrate and dissolve. By keeping the mass in motion during the reaction a granulated product was obtained which could easily be removed from the vessel in dry form if so desired without further disintegration, or which could easily be lixiviated in the reaction vessel itself.

That a continuous operation for the reaction of ilmenite with sulphuric acid offers certain advantages over batch operation was early recognized. Thus, U. S. Patent No. 1,333,819 describes a continuous process for the digestion of titaniferous ores with sulphuric acid involving an endless chain of pans moving through a hot reaction chamber. In the process of the above patent the ore-acid mixture is poured into the pans just before they enter the reaction chamber through which the charged pans move at a predetermined rate through controlled heating zones. As the pans emerge at the opposite end of the reaction chamber the pans with their content are tipped on their way downward and back to be refilled with fresh ore-acid mixture. The removal of the reacted mass or digestion cake from the pans in the above process was usually accomplished by the use of crowbars and by hammering on the sides and the bottom of the tipped pans as they slowly moved away. However, it was not always possible to loosen the cake in the short time interval available for this operation. In such cases the cake would be returned to the hot reaction chamber where it would be subjected to a second undesired heat treatment. Material which has been subjected to a longer heat treatment or to higher temperatures than prescribed is hereinafter designated as "overbaked" material. Also, even though it was possible to remove the bulk of the digested mass from the pans in most instances, it was quite impossible to return the pans in a clean condition. Some adhering reacted material would invariably be returned to the reaction chamber constituting a direct loss in production and causing the formation of a portion of "overbaked" difficultly soluble basic compounds of titanium which subsequently during the lixiviation of the digested product would cause poor settling and produce a final solution of low stability.

More recently improved continuous processes have been described in U. S. Patents No. 2,098,025 and No. 2,098,026. The necessity of keeping the reaction mass in constant motion to prevent sticking is fully recognized in these processes. As the ore-acid mixture in the process of U. S. Patent 2,098,025 is moved forward while being heated it is at the same time tumbled by the aid of either scrapers or paddles which prevent the building up of heavy layers of reacted material upon the walls of the apparatus. The ore-acid mixture, which is in the process of U. S. Patent 2,098,026 is mixed with sufficient amounts of already finished reacted material to produce a quite dry reaction mixture, is fed into a rotary kiln where the reaction takes place. Excessive "sticking" is in this process said to be checked as a result of the dry consistency of the starting material.

The problem of preventing sticking or adhesion is approached in a somewhat different manner in the processes described in U. S. Patents No. 2,098,054 and No. 2,098,055, the mixing and the reaction taking place in a heated steel ball mill or in a conveyor type apparatus with two helicoidal screws rotating at different speeds, the material being propelled from the feeder end to the discharge end of a trough while it is being heated and reacted.

In spite of all the elaborate precautions taken and devices designed in the improved processes of the prior art to prevent the characteristic "sticking" of the reacted mass, in none of them has the problem been satisfactorily solved in a simple, effective and economical manner.

It is one object of our invention to provide means whereby the phenomenon which herein has been designated as "sticking" may be completely and effectively overcome, by a simple and economical method. Further objects include the elimination of "overbaked" material; the obtaining of increased yield of soluble titanium values; increasing production; and the protection of the surface upon which the reaction takes place. These and other objects of our invention will be understood as this description proceeds.

In our invention the "ticking" of the reacted mass to the surface of the reaction apparatus is prevented by placing a layer preferably of a carbonizable organic nature on the surface with which the reaction mixture is in contact during and after the reaction. This layer may, for example, consist of cellulose fibers, a sheet of ordinary paper, an applied layer of glue, molasses, sugar, starch, casein or similar materials, grease, oil, tar and rubberlike compounds or other films of suitable characteristics, for example paints or other coating compositions—in short any material which will prevent direct contact between the reaction mass and the surface upon which it rests. In cases where the reaction temperature is much higher than in the case of reactions involving for example ilmenite and sulphuric acid we may use as protective material such organic materials which can withstand the heat better than those already enumerated above. We may also in such reactions secure the protective layer by using a more dense layer of any of the above mentioned compounds in which case a somewhat thicker layer of charred material will be formed which will prevail throughout the reaction. We may also under such circumstances use other protective materials than those already mentioned. For example, a layer of a mixture of an organic compound such as paper fibers and an inorganic compound such as asbestos fiber, or a layer of asbestos fibers alone, may be used in our invention. It will of course be understood that any protective material that may have an unfavorable contaminating effect upon the reaction product are excluded from our method. In order that our novel method may be better understood by those skilled in the art we shall now further explain and illustrate its working with the aid of the following examples.

Example I

A continuous digestion apparatus was employed consisting of a smooth endless steel belt traveling at a regulated speed over two pulleys through a hot chamber inside of which the temperature is closely regulated. Upon the moving endless metal belt was placed a continuous layer of ordinary newspaper. A preheated, heavy flowing mixture of ground ilmenite and concentrated sulphuric acid in an amount twenty-five per cent below that required to form a normal titanium sulphate was now poured upon the moving paper covered metal belt at the feeding end of the apparatus forming thereon a layer of about ¼" thickness. As the belt travelled forward through the heating, reaction and baking zones of the chamber, the paper charred as a result of the heat and the action of the sulphuric acid. The reaction product, which in the zone adjacent to the exit from the heated chamber had been subjected to a curing or baking treatment to secure a more complete reaction, emerged as a dry porous layer of uniform thickness. As the endless belt turned on the pulley the dry reaction product separated into pieces and fell off by its own weight, leaving a clean belt surface to which no material clung except some remnants of the charred paper. The clean endless belt moved back towards the feeding end where a new cover of paper was placed upon the belt surface and a fresh layer of reaction mixture was poured thereon.

If so desired an adjustable knife or scraper may be placed at the discharge end for the purpose of lifting the layer of finished material and charred paper from the moving belt.

The experiment was repeated this time omitting the protecting layer of paper. It was now found that the reacted mass stuck tenaciously to the unprotected metal surface from which it could not be completely separated. A part of the reacted material was therefore returned to the process, lowering the production, endangering normal settling and stability of the subsequent solution and lowering the yield of soluble titanium.

It should be understood that amounts, concentrations of acid, kinds of material and conditions of temperature under which our process may be operated are well-known in the art, the novelty of our invention residing solely in the complete elimination of "sticking" of the reaction material.

Example II

Residue or "mud" (obtained from a previous digestion of ilmenite-concentrated sulphuric acid) was removed from a filter in the form of a wet cake which then was mixed with concentrated sulphuric acid in an amount sufficient to substantially recover the titanium values in the form of soluble sulphates. The thoroughly mixed material was then reacted on the moving metal belt as in the previous experiment. As in Example I where ilmenite was used, the reaction product obtained from "mud" and sulfuric acid was easily removed from the belt when a protective layer of paper was employed, but could not be completely separated when the reaction was allowed to take place upon the unprotected metal surface.

Example III

Finely ground zirconium oxide was intimately mixed with a quantity of concentrated sulphuric acid about twenty-five per cent under that required for the formation of a normal zirconium sulphate. The temperature at which this reaction is brought to completion is much higher than in the case of ilmenite and sulphuric acid. A baking temperature of about 375° C. is required for the zirconium whereas less than 200° C. is sufficient for the ilmenite. A thin protective layer of a mixture of paper fibers and asbestos fibers was placed upon the moving metal belt. The zirconium oxide-sulphuric acid mixture was first heated in a separate vessel until the mixture thickened. The thickening reaction mixture was then poured upon the protected moving metal belt and reacted at about 375° C. in the reaction chamber. A layer of easily removable undigestion product was obtained which was uncontaminated except for a few asbestos fibers and a small, harmless amount of charred paper fibers. The presence of the insoluble asbestos did not have any detrimental effect upon the subsequent steps involving the preparation of a pure solution of zirconium sulphate.

When the experiment was repeated without the protective layer of paper-asbestos fibers the cake of reacted material adhered strongly to the metal surface from which it was nearly impossible to get it separated.

In order to examine the effect upon the metal surface wrought by the acid-ore mixtures smaller samples of "mud" and concentrated sulphuric acid were placed upon small pieces of sheets of Swedish steel. Two pieces were unprotected, two pieces were covered with a single layer of ordinary newspaper. A ¼" layer of ilmenite "mud"-acid mixture was placed upon the sheets which were placed in an electric oven at 180° C. for 60 minutes. After cooling the reaction mass was removed from the metal surfaces which were then cleaned. A microscopic examination of the metal sheets revealed that the unprotected surfaces showed considerable pitting whereas the surfaces which had been protected with a layer of paper showed no change whatever.

As illustrations of the operation of our invention we have in the foregoing used the well-known reactions between the most commonly used titaniferous materials and concentrated sulphuric acid. We have also described the application of our invention in the reaction of zirconium oxide with concentrated sulphuric acid. It should, however, be understood that the invention may be applied with equal success to other reactions and processes such as for example the manufacture of superphosphate and in the preparation of anhydrous ferric sulphate from ferric oxide and sulphuric acid. Furthermore, although the foregoing examples illustrate the invention in connection with continuous processes the invention may be equally well adapted in single step, or "batch" process.

Our invention may also be usefully applied in other reactions of which the following may be mentioned: The dehydration and disintegration of the dry or semi-dry paste of calcium sulphate and sulphuric acid; the manufacture of hydrochloric acid from, for example, sodium chloride and sulphuric acid; the manufacture of nitric acid from nitrates and sulphuric acid; and, in any reaction involving solid reaction products which are apt to adhere to the surface of the reaction apparatus.

Our invention is not only operable in connection with metal surfaces but can be applied in processes where the reaction product solidifies on, for example, brick, cement and other similar surfaces.

The above detailed description of our invention has been given for clearness of understanding and no undue limitations should be deduced therefrom. It is to be understood that variations within the skill of the art are to be embraced within the scope of our invention and the appended claims are to be accordingly construed.

We claim:

1. A method for continuously conducting thermo-chemical reactions of the type which yield solid or semi-solid reaction products having a tendency to adhere to the surfaces of reaction apparatus which comprises continuously applying to the surface of a moving endless conveyor a protective layer containing a fibrous carbonizable organic substance while continuously depositing thereon a chemical reaction mixture comprising a mineral acid and metalliferous material, the said protective layer being interposed between the surface of the conveyor and the reaction mixture, continuously conveying the reaction mixture deposited upon the protective layer through a heating zone to initiate the reaction and continuously discharging the reaction product from the surface of the conveyor after its passage through the heating zone.

2. A method for continuously conducting thermo-chemical reactions of the type which yield solid or semi-solid reaction products having a tendency to adhere to the surfaces of reaction apparatus which comprises continuously applying to the surface of a moving endless conveyor a protective layer containing a fibrous carbonizable organic substance while continuously depositing thereon a reaction mixture comprising a mineral acid and a titanium-containing material the said protective layer being interposed between the surface of the conveyor and the reaction mixture, continuously conveying the reaction mixture deposited upon the protective layer through a heating zone to initiate the reaction and continuously discharging the reaction product from the surface of the conveyor after its passage through the heating zone.

3. A method for continuously conducting the reaction between ilmenite ore and concentrated sulphuric acid which comprises continuously applying to the surface of a moving endless conveyor a protective layer containing a fibrous carbonizable organic substance while continuously depositing thereon a reaction mixture comprising concentrated sulphuric acid and ilmenite ore the said protective layer being interposed between the surface of the conveyor and the reaction mixture, continuously conveying the reaction mixture deposited upon the protective layer through a heating zone to initiate the reaction and to cure the reaction product and continuously discharging the reaction product from the surface of the conveyor after its passage through the heating zone.

4. Process according to claim 1 wherein the carbonizable organic substance is cellulosic fibers.

5. Process according to claim 1 wherein the carbonizable organic substance is a mixture of cellulosic fibers and asbestos.

6. Process according to claim 3 wherein the carbonizable organic substance is cellulosic fibers.

7. Process according to claim 3 wherein the carbonizable organic substance is a mixture of cellulosic fibers and asbestos.

8. A method for continuously conducting thermo-chemical reactions of the type which yield solid or semi-solid reaction products having a tendency to adhere to the surfaces of reaction apparatus which comprises continuously applying to the surface of a moving endless conveyor a protective layer containing a fibrous carbonizable organic substance while continuously depositing thereon a reaction mixture comprising a mineral acid and a zirconium-containing material the said protective layer being interposed between the surface of the conveyor and the reaction mixture, continuously conveying the reaction mixture deposited upon the protective layer through a heating zone to initiate the reaction and continuously discharging the reaction product from the surface of the conveyor after its passage through the heating zone.

WALTER GORDON MORAN.
JOHN EDWARD NELSON.